US009694337B2

(12) United States Patent
Boday et al.

(10) Patent No.: US 9,694,337 B2
(45) Date of Patent: Jul. 4, 2017

(54) MICROCAPSULES ADAPTED TO RUPTURE IN A MAGNETIC FIELD TO ENABLE EASY REMOVAL OF ONE SUBSTRATE FROM ANOTHER FOR ENHANCED REWORKABILITY

(71) Applicant: International Business Machines Corporation, Armonk, NY (US)

(72) Inventors: Dylan J. Boday, Tucson, AZ (US); Joseph Kuczynski, North Port, FL (US); Robert E. Meyer, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/207,016

(22) Filed: Jul. 11, 2016

(65) Prior Publication Data
US 2016/0317994 A1    Nov. 3, 2016

Related U.S. Application Data

(62) Division of application No. 14/930,336, filed on Nov. 2, 2015, now Pat. No. 9,434,133, which is a division of application No. 13/204,009, filed on Aug. 5, 2011, now Pat. No. 9,186,641.

(51) Int. Cl.
*B01J 13/18* (2006.01)
*B32B 43/00* (2006.01)
*H01F 1/00* (2006.01)
*B32B 9/04* (2006.01)
*C09K 5/08* (2006.01)

(52) U.S. Cl.
CPC .............. *B01J 13/18* (2013.01); *B32B 9/04* (2013.01); *B32B 43/006* (2013.01); *C09K 5/08* (2013.01); *H01F 1/0054* (2013.01); *B32B 2264/02* (2013.01); *B32B 2307/208* (2013.01); *B32B 2457/00* (2013.01); *Y10T 156/1111* (2015.01); *Y10T 428/31663* (2015.04)

(58) Field of Classification Search
CPC .......... B01J 13/18; B32B 43/006; B32B 9/04; H01F 1/0054; C09K 5/08; Y10T 428/2982
USPC ........... 428/403, 407; 156/703; 252/62.51 R; 264/4.7
See application file for complete search history.

(56) References Cited

U.S. PATENT DOCUMENTS

| 3,686,930 | A | 8/1972 | Kniebes et al. |
| 3,748,827 | A | 7/1973 | Bulian et al. |
| 3,936,976 | A | 2/1976 | Porter et al. |
| 3,956,179 | A | 5/1976 | Sebastian et al. |
| 4,115,081 | A | 9/1978 | Ohno et al. |
| 4,425,117 | A | 1/1984 | Hugemann et al. |
| 4,657,843 | A | 4/1987 | Fukuyama et al. |
| 4,670,299 | A | 6/1987 | Fukuyama et al. |
| 4,781,733 | A | 11/1988 | Babcock et al. |
| 4,904,632 | A | 2/1990 | Pesek et al. |
| 4,950,314 | A | 8/1990 | Yamada et al. |
| 4,965,062 | A | 10/1990 | Van Dijk et al. |
| 5,147,957 | A | 9/1992 | Kumar |
| 5,233,071 | A | 8/1993 | Wilczek |
| 5,286,280 | A | 2/1994 | Chiou |
| 5,733,663 | A | 3/1998 | Scheunemann et al. |
| 5,741,579 | A | 4/1998 | Nishizawa |
| 5,777,007 | A | 7/1998 | Kagawa et al. |
| 5,876,739 | A | 3/1999 | Turnblad et al. |
| 5,925,595 | A | 7/1999 | Seitz et al. |
| 6,001,943 | A | 12/1999 | Enami et al. |
| 6,060,530 | A | 5/2000 | Chaouk et al. |
| 6,165,253 | A | 12/2000 | Sirkar et al. |
| 6,339,166 | B1 | 1/2002 | Allcock et al. |

(Continued)

FOREIGN PATENT DOCUMENTS

DE    19857697 A1    6/2000
DE    102005056052 A1    5/2007

(Continued)

OTHER PUBLICATIONS

Shang-Hsiu Hu et al. "Controlled Rupture . . . " Langmuir 2008, 24, 11811-11818.*
Yamaura et al. "Preparation and characterization of . . . magnetite nanoparticles" Journal of Magnetism and Magnetic Materials 279 (2004) 210-217.*
U.S. Appl. No. 13/204,009 to Boday et al., entitled "Microcapsules Adapted to Rupture in a Magnetic Field to Enable Easy Removal of One Substrate From Another for Enhanced Reworkability," filed Aug. 5, 2011.

(Continued)

Primary Examiner — Leszek Kiliman
(74) Attorney, Agent, or Firm — Matthew J. Bussan

(57) ABSTRACT

An enhanced thermal interface material (TIM) gap filler for filling a gap between two substrates (e.g., between a coldplate and an electronics module) includes microcapsules adapted to rupture in a magnetic field. The microcapsules, which are distributed in a TIM gap filler, each have a shell that encapsulates a solvent. One or more organosilane-coated magnetic nanoparticles is/are covalently bound into the shell of each microcapsule. In one embodiment, (3-aminopropyl) trimethylsilane-coated magnetite nanoparticles are incorporated into the shell of a urea-formaldehyde (UF) microcapsule during in situ polymerization. To enable easy removal of one substrate affixed to another substrate by the enhanced TIM gap filler, the substrates are positioned within a magnetic field sufficient to rupture the microcapsule shells through magnetic stimulation of the organosilane-coated magnetic nanoparticles. The ruptured microcapsule shells release the solvent, which dissolves and/or swells the TIM gap filler, thereby reducing the bond strength between the substrates.

9 Claims, 7 Drawing Sheets

(56) References Cited

U.S. PATENT DOCUMENTS

| | | |
|---|---|---|
| 6,417,236 B1 | 7/2002 | Hobson et al. |
| 6,514,439 B2 | 2/2003 | Van Koppenhagen et al. |
| 6,673,246 B2 | 1/2004 | Markowitz et al. |
| 6,682,751 B1 | 1/2004 | Hargrove et al. |
| 6,710,181 B2 | 3/2004 | Kumagai et al. |
| 6,744,269 B1 | 6/2004 | Johnson et al. |
| 6,805,964 B2 | 10/2004 | Clouser et al. |
| 6,858,634 B2 | 2/2005 | Asrar et al. |
| 6,900,269 B2 | 5/2005 | Hwang et al. |
| 6,972,249 B2 | 12/2005 | Akram et al. |
| 6,986,943 B1 | 1/2006 | Cook et al. |
| 7,056,522 B2 | 6/2006 | Voris et al. |
| 7,101,394 B2 | 9/2006 | Hamm et al. |
| 7,169,832 B2 | 1/2007 | Poppe et al. |
| 7,211,192 B2 | 5/2007 | Shea et al |
| 7,553,901 B2 | 6/2009 | Horikoshi et al. |
| 7,585,320 B2 | 9/2009 | Hamm et al. |
| 7,687,722 B2 | 3/2010 | Japp et al. |
| 7,759,406 B2 | 7/2010 | Kumon et al. |
| 7,767,219 B2 | 8/2010 | Weber et al. |
| 7,767,736 B2 | 8/2010 | Baran, Jr. |
| 7,814,737 B2 | 10/2010 | Pierson |
| 7,851,055 B2 | 12/2010 | Fukushima |
| 8,741,804 B2 | 6/2014 | Boday et al. |
| 9,186,641 B2 * | 11/2015 | Boday ............... B01J 13/18 |
| 9,434,133 B2 * | 9/2016 | Boday ............... B01J 13/18 |
| 2002/0014154 A1 | 2/2002 | Witzko et al. |
| 2002/0026980 A1 | 3/2002 | Nakatani et al. |
| 2002/0119317 A1 | 8/2002 | Gan et al. |
| 2003/0022791 A1 | 1/2003 | Asrar et al. |
| 2003/0173255 A1 | 9/2003 | White et al. |
| 2004/0062873 A1 | 4/2004 | Jung et al. |
| 2004/0149127 A1 | 8/2004 | Lyons et al. |
| 2006/0000766 A1 | 1/2006 | Ji |
| 2006/0118490 A1 | 6/2006 | Landry et al. |
| 2007/0023957 A1 | 2/2007 | Kotov et al. |
| 2007/0164271 A1 | 7/2007 | Wait, Jr. |
| 2007/0215004 A1 | 9/2007 | Kuroda et al. |
| 2007/0241303 A1 | 10/2007 | Zhong et al. |
| 2007/0251393 A1 | 11/2007 | Pope et al. |
| 2007/0257091 A1 | 11/2007 | Kuczynski |
| 2007/0270536 A1 | 11/2007 | Sachdev et al. |
| 2008/0097014 A1 | 4/2008 | Park et al. |
| 2008/0191729 A1 | 8/2008 | Blanco et al. |
| 2008/0193543 A1 * | 8/2008 | Morello, III ......... A61K 9/0009 424/490 |
| 2008/0210087 A1 | 9/2008 | Ku et al. |
| 2008/0264563 A1 | 10/2008 | Kuczynski et al. |
| 2009/0004488 A1 | 1/2009 | Park et al. |
| 2009/0117373 A1 | 5/2009 | Wisniewski et al. |
| 2009/0142638 A1 | 6/2009 | Katayama |
| 2010/0027192 A1 | 2/2010 | Perry et al. |
| 2010/0030185 A1 | 2/2010 | Hood et al. |
| 2010/0234481 A1 | 9/2010 | Sugimoto et al. |
| 2010/0240811 A1 | 9/2010 | He et al. |
| 2010/0243520 A1 | 9/2010 | Glover et al. |
| 2011/0092640 A1 | 4/2011 | Tzou |
| 2011/0097416 A1 * | 4/2011 | Nguyen ............... A61K 9/0009 424/497 |
| 2011/0189381 A1 | 8/2011 | Boday et al. |
| 2012/0187046 A1 | 7/2012 | Boday et al. |
| 2012/0256224 A1 | 10/2012 | Hatanaka et al. |
| 2012/0279768 A1 | 11/2012 | Boday et al. |
| 2013/0034739 A1 | 2/2013 | Boday et al. |
| 2013/0131244 A1 | 5/2013 | Dickens |

FOREIGN PATENT DOCUMENTS

| | | |
|---|---|---|
| EP | 0315836 A2 | 5/1989 |
| JP | 53-42181 A | 4/1978 |
| JP | 61144339 A | 7/1986 |
| JP | 2000-297094 | 10/2000 |
| JP | 2005197609 A | 7/2005 |
| WO | 2006/096033 A1 | 9/2006 |
| WO | 20110708010 A1 | 6/2011 |

OTHER PUBLICATIONS

U.S. Appl. No. 14/930,336, to Boday et al., entitled "Microcapsules Adapted to Rupture in a Magnetic Field to Enable Easy Removal of One Substrate From Another for Enhanced Reworkability", filed Nov. 2, 2015, assigned to International Business Machines Corporation.

Shang-Hsiu Hu et al., "Controlled Rupture of Magnetic Polyelectrolyte Microcapsules for Drug Delivery," Langmuir, vol. 24, No. 20, pp. 11811-11818, 2008.

B. J. Blaiszik et al., "Microcapsules filled with reactive solutions for self-healing materials," Polymer, vol. 50, pp. 990-997, 2009.

E. N. Brown et al., "In situ poly(urea-formaldehyde) microencapsulation of dicyclopentadiene," Journal of Microencapsulation, vol. 20, No. 6, pp. 719-730, 2003.

M. Yamaura et al., "Preparation and characterization of (3-aminopropyl) triethoxysilane-coated magnetite nanoparticles," Journal of Magnetism and Magnetic Materials, vol. 279, pp. 210-217, 2004.

S. F. Peteu et al., "Responsive Polymers for Crop Protection," Polymers, vol. 2, pp. 229-251, Aug. 19, 2010.

J. Liu et al., "Magnetically Sensitive Alginate-Templated Polyelectrolyte Multilayer Microcapsules for Controlled Release of Doxorubicin," Journal of Physical Chemistry C, vol. 114, No. 17, pp. 7673-7679, Apr. 14, 2010.

M. Alley et al., "Pop-up and/or Starter Fertilizers for Corn," Virginia Cooperative Extension Publication 3002-1438, pp. 1-5, 2010.

Guoliang Zhang, E.L. Cussler, "Hollow fibers as structured distillation packing", Journal of Membrane Science, vol. 215, Issues 1-2, Apr. 15, 2003, pp. 185-193.

J. Andrieu, "Influence of Wettability on Liquid Phase Texture in a Countercurrently Irrigated Packing", Chemical Engineering Science, vol. 30, 1975, pp. 217-220.

Barry S. Hindin, "Silver Sulfide Corrosion Control Using Corrosion Prevention Compounds", Corrosion 2006, Mar. 12-16, 2006, San Diego, California, Paper No. 06264, Copyright 2006, NACE International.

English translation of DE 19857697 A1, Jun. 15, 2000.

U.S. Appl. No. 12/696,328, to Boday et al., entitled "Anti-Corrosion Conformal Coating for Metal Conductors Electrically Connecting an Electronic Circuit", filed Jan. 29, 2010, assigned to International Business Machines Corporation.

Wikipedia contributors, "Natural gas processing", Wikipedia, The Free Encyclopedia, http://en.wikipedia.org/w/index.php?title=Natural_gas_processing&oldid=400027904 (accessed Dec. 13, 2010).

Wikipedia contributors, "Silsesquioxane", Wikipedia, The Free Encyclopedia, http://en.wikipedia.org/w/index.php?title=Silsesquioxane&oldid=402217379 (accessed Dec. 13, 2010).

"Ucarsol GT 10 Antifoam", Product Information, Gas Treating Products & Services, The Dow Chemical Company, Midland, Michigan, Published Jul. 2004. (Available at http://www.dow.com/gastreating/solution/ngp_osr.htm).

King, David L., et al., "Removal of Sulfur Components from Low Sulfur Gasoline Using Copper Exchanged Zeolite Y at Ambient Temperature", Pacific Northwest Laboratory, Richland, Washington, 2005, 1 page. (Available at http://iic.pnl.gov/abstracts/nacs/p_001.pdf).

"Hydrogen Sulfide Removal Methods", Excel Water Technologies, Inc., Fort Lauderdale, Florida, dated 2007. (Available at http://www.excelwater.com/eng/b2c/h2s.php).

I. Manconi et al., "Removal of H2S and Voltaile Organic Sulfur Compounds by Silicone Membrane Extraction", Research Article, Society of Chemical Industry, Aug. 4, 2008, pp. 69-77.

U.S. Appl. No. 13/010,995, to Boday et al., entitled "Silicone-Based Chemical Filter and Silicone-Based Chemical Bath for Removing Sulfur Contaminants", filed Jan. 21, 2013, assigned to International Business Machines Corporation.

(56) References Cited

OTHER PUBLICATIONS

U.S. Appl. No. 13/802,543, to Boday et al., entitled "Silicone-Based Chemical Filter and Silicone-Based Chemical Bath for Removing Sulfur Contaminants", filed Mar. 13, 2013, assigned to International Business Corporation.
U.S. Appl. No. 13/802,652, to Boday et al., entitled "Silicone-Based Chemical Filter and Silicone-Based Chemical Bath for Removing Sulfur Contaminants", filed Mar. 13, 2013, assigned to International Business Machines Corporation.
U.S. Appl. No. 15/044,150, to Boday et al., entitled "Removing Sulfur Contaminants From Water Using a Silicone-Based Chemical Filter", filed Feb. 16, 2016, assigned to International Business Machines Corporation.
U.S. Appl. No. 15/044,175, to Boday et al., entitled "Removing Sulfur Contaminants From a Fluid Using a Silicone-Based Chemical Filter", filed Feb. 16, 2016, assigned to International Business Machines Corporation.
Kumar et al., "Instantaneous, Facile and Selective Synthesis of Tetrabromobisphenol A using Potassium Tribromide: An Efficient and Renewable Brominating Agent", Organic Process Research & Development, vol. 14, No. 1, 2010, pp. 174-179, Published on Web Dec. 20, 2009.
U.S. Appl. No. 13/102,306, to Boday et al., entitled "Flame Retardant Filler", filed May 6, 2011, assigned to International Business Machines Corporation.
U.S. Appl. No. 14/512,491, to Boday et al., entitled "Flame Retardant Filler", filed Oct. 13, 2014, assigned to International Business Machines Corporation.
U.S. Appl. No. 15/015,905, to Boday et al., entitled "Flame Retardant Filler", filed Feb. 4, 2016 assigned to International Business Machines Corporation.
"Flame Retardant Fact Sheet; Other Phosphorous Flame Retardants", European Flame Retardants Association, Sep. 28, 2011, 2 pages. (http://www.cefic-efra.com/images/stories/factsheet/7OtherPhosphorusFactSheetAB-1_00.pdf).
English Language Translation of Claims in CN101033327 (2007), 2 pages.
U.S. Appl. No. 13/397,010, to Boday et al., entitled "Non-Halogenated Flame Retardant Filler", filed Feb. 15, 2012, assigned to International Business Machines Corporation.
Dean et al., "Characterization of a Thermal Interface Material for Burn-in Application", 2000, 6 pages. <https://www51.honeywell.com/sm/em/common/documents/4.2_technical_papers_2000_4.pdf>.
"Development of Heat-dissipating Sheets achieving both Metal-like High Thermal Conductivity and Flexibility", News Release, Hitachi Chemical Co., Ltd., Japan, Jun. 23, 2009, 3 pages. <http://www.hitachi-chem.co.jp/english/information/2009/n_090623.html>.
"Hi-Flow 225FT; Reworkable, Pressure Sensitive Phase Change Material", Product Brochure, The Bergquist Company, Chanhassen, Minnesota, 2008, 1 page. <http://www.bergquistcompany.com/pdfs/dataSheets/PDS_HF_225FT_12.08_E.pdf>.
U.S. Appl. No. 13/495,132, to Boday et al., entitled "Thermal Interface Material (TIM) With Thermally Conductive Integrated Release Layer", filed Jun. 13, 2012, assigned to International Business Machines Corporation.
Christopher O. Muller, "Control of Corrosive Gases to Avoid Electrical Equipment Failure", Purafil, Inc., webpage: www.purafil.com/literature/control-of-corrosive-gases.pdf, 1999, pp. 1-13.
Manuel A. Rivera, "Design Considerations for Reliable Electrical, Control and Instrumentation Systems in Geothermal Power Plants With Emphasis on Hydrogen Sulphide Related Problems", Geothermal Training Programme; United Nations University; 2007, pp. 461-490.
Ezdine Ferjani et al., "Bulk and surface modification of cellulose diacetate based RO/NF membranes by polymethylhydrosiloxane—Preparation and characterization", Desalination, vol. 146, Issues 1-3, 2002, pp. 325-330.
Ronald L. Cicero et al., "Photoreactivity of Unsaturated Compounds with Hydrogen-Terminated Silicon (111)", Langmuir, vol. 16, Issue 13, 2000, pp. 5688-5695.
John H. MacMillan, Ph.D., "Homogeneous Platinum Catalysts", United Chemical Technologies, Inc., 2008, 69 pages.
Rosaria Ciriminna, et al., "Closing the Organosilicon Synthetic Cycle: Efficient Heterogeneous Hydrosilylation of Alkenes over SiliaCat Pt(0)", ACS Sustainable Chemistry & Engineering, 2012, 5 pages.
U.S. Appl. No. 13/283,734, to Boday et al., entitled "Microcapsules Adapted to Rupture in a Magnetic Field", filed Oct. 28, 2011, assigned to International Business Machines Corporation.
U.S. Appl. No. 14/244,921, to Boday et al., entitled "Microcapsules Adapted to Rupture in a Magnetic Field", filed Apr. 4, 2014, assigned to International Business Machines Corporation.
U.S. Appl. No. 14/244,964, to Boday et al., entitled "Microcapsules Adapted to Rupture in a Magnetic Field", filed Apr. 4, 2014, assigned to International Business Machines Corporation.
U.S. Appl. No. 14/245,074, to Boday et al., entitled "Microcapsules Adapted to Rupture in a Magnetic Field", filed Apr. 4, 2014, assigned to International Business Machines Corporation.
English language machine translation of abstract of JP53-42181 (1978), 1 page.
CAS Registry No. 2530-83-8, SciFinder, American Chemical Society (ACS), 2015, 1 page.

\* cited by examiner

US 9,694,337 B2

MICROCAPSULES ADAPTED TO RUPTURE IN A MAGNETIC FIELD TO ENABLE EASY REMOVAL OF ONE SUBSTRATE FROM ANOTHER FOR ENHANCED REWORKABILITY

CROSS-REFERENCE TO RELATED APPLICATIONS

This patent application is a divisional application of pending U.S. patent application Ser. No. 14/930,336, filed Nov. 2, 2015, entitled "MICROCAPSULES ADAPTED TO RUPTURE IN A MAGNETIC FIELD TO ENABLE EASY REMOVAL OF ONE SUBSTRATE FROM ANOTHER FOR ENHANCED REWORKABILITY", which is a divisional application of U.S. patent application Ser. No. 13/204,009, filed Aug. 5, 2011, entitled "MICROCAPSULES ADAPTED TO RUPTURE IN A MAGNETIC FIELD TO ENABLE EASY REMOVAL OF ONE SUBSTRATE FROM ANOTHER FOR ENHANCED REWORKABILITY", each of which is hereby incorporated herein by reference in its entirety.

BACKGROUND OF THE INVENTION

1. Field of Invention

The present invention relates in general to the fields of removability, reworkability and recyclability. More particularly, the present invention relates to a method and apparatus employing microcapsules adapted to rupture in a magnetic field to enable a first substrate (e.g., a coldplate) to be easily removed from a second substrate (e.g., an electronics module) for enhanced reworkability or recyclability.

2. Background Art

In general, it is desirable for a thermal interface material (TIM) gap filler between a first substrate (e.g., a coldplate) and a second substrate (e.g., a cap of an electronics module) to exhibit adequate adhesion (i.e., the thermal performance of the interface is reduced if an air gap is introduced from voids or delamination), yet possess a low enough bond strength to allow for rework. In the case of a "TIM2" gap filler (e.g., between a bottom surface of a coldplate and a top surface of a cap of an electronics module), for instance, it is desirable for the TIM gap filler to exhibit adequate adhesion to both the bottom surface of the coldplate and the top surface of the cap of the electronics module, yet possess a low enough bond strength between itself and the coldplate to allow for rework. In this case, the coldplate must be completely removed from a defective electronics module to provide reworkability to the module during manufacture or in the field. Several approaches to address this problem have focused on a pad TIM2 and a cross-linked silicone gel. A serious drawback to the first approach (i.e., a pad TIM2) is that pads are not compressible enough, resulting in poor thermal performance at the interface. A serious drawback to the second approach (i.e., a cross-linked silicone gel) is that gels can "pump" out of the interface due to thermal cycling. Another approach to address this problem is to utilize a picture-in-picture-frame concept, wherein the "picture frame" is comprised of a pad and the "picture" is comprised of a cross-linked silicone gel. In the case of this hybrid approach, the pad prevents the gel from pumping; and because the bulk of the TIM gap filler is a gel, adequate compression to the desired bond line is provided. However, the hybrid approach disadvantageously requires the use of two distinct TIM gap filler materials, as well as a custom die-cut pad.

Although described in the context of removing a coldplate adhered to an electronics module by a TIM gap filler, the problem discussed above also exists in the more general context of removing one substrate from another. For example, a similar problem exists in the context of removing a first substrate from a second substrate for purposes such as recycling, reworkability, and the like. In one illustrative example, labels are frequently attached to products, such as computers and other electronic devices, for purposes of information, safety and security. Typically, an adhesive layer permanently affixes the label to the product to prevent the label from falling off or being removed from the product. For example, the use of pressure sensitive adhesive (PSA) labels for such purposes is well known in the art. Typically, the pressure sensitive adhesives used on these labels are extremely tenacious and tend to exhibit exceptional adhesion well beyond the lifetime of the product. Removable labels, i.e., labels provided with a removable adhesive layer possessing temporary as opposed to permanent bonding characteristics, are known in the art but are typically not used because of the increased likelihood that such labels will fall off the product and because such labels undesirably enable inappropriate removal by the user. For example, it is generally undesirable for a user to remove a safety label from a cover of a computer enclosure.

Hence, labels that are permanently affixed to the product are typically preferred from a product use perspective. From the recycling perspective, however, labels that are permanently affixed to products are problematic. Typically, the label must be removed from the product before it is possible to recycle the label-bearing part of the product. Generally, the removal of permanently affixed labels is a difficult and time consuming task and often results in unsatisfactory results, i.e., remnants of labels and/or adhesive residue may remain on the product. Contamination by the label remnants and/or adhesive residue makes it practically impossible to recycle products bearing permanently affixed labels. The wasteful and undesirable practice of burying the label-bearing parts of such products in landfills is often the only available disposal technique. Depending on the composition of the label-bearing parts, incineration may be an available alternative disposal technique, but generally is also a wasteful and undesirable practice.

It should therefore be apparent that a need exists for an enhanced mechanism for enabling a first substrate to be easily removed from a second substrate for enhanced reworkability (during manufacture or in the field) or recyclability (at a product's end-of-life).

SUMMARY OF THE INVENTION

According to the preferred embodiments of the present invention, an enhanced thermal interface material (TIM) gap filler for filling a gap between two substrates (e.g., between a coldplate and an electronics module) includes microcapsules adapted to rupture in a magnetic field. The microcapsules, which are distributed in a TIM gap filler, each have a shell that encapsulates a solvent. One or more organosilane-coated magnetic nanoparticles is/are covalently bound into the shell of each microcapsule. In one embodiment, (3-aminopropyl) trimethylsilane-coated magnetite nanoparticles are incorporated into the shell of a urea-formaldehyde (UF) microcapsule during in situ polymerization of the UF microcapsule. To enable easy removal of one substrate affixed to another substrate by the enhanced TIM gap filler, the substrates are positioned within a magnetic field sufficient to rupture the microcapsule shells through magnetic stimulation of the organosilane-coated magnetic nanoparticles. The ruptured microcapsule shells release the solvent, which dissolves and/or swells the TIM gap filler, thereby reducing the bond strength between the substrates.

The foregoing and other features and advantages of the present invention will be apparent from the following more particular description of the preferred embodiments of the present invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

Figure 1:
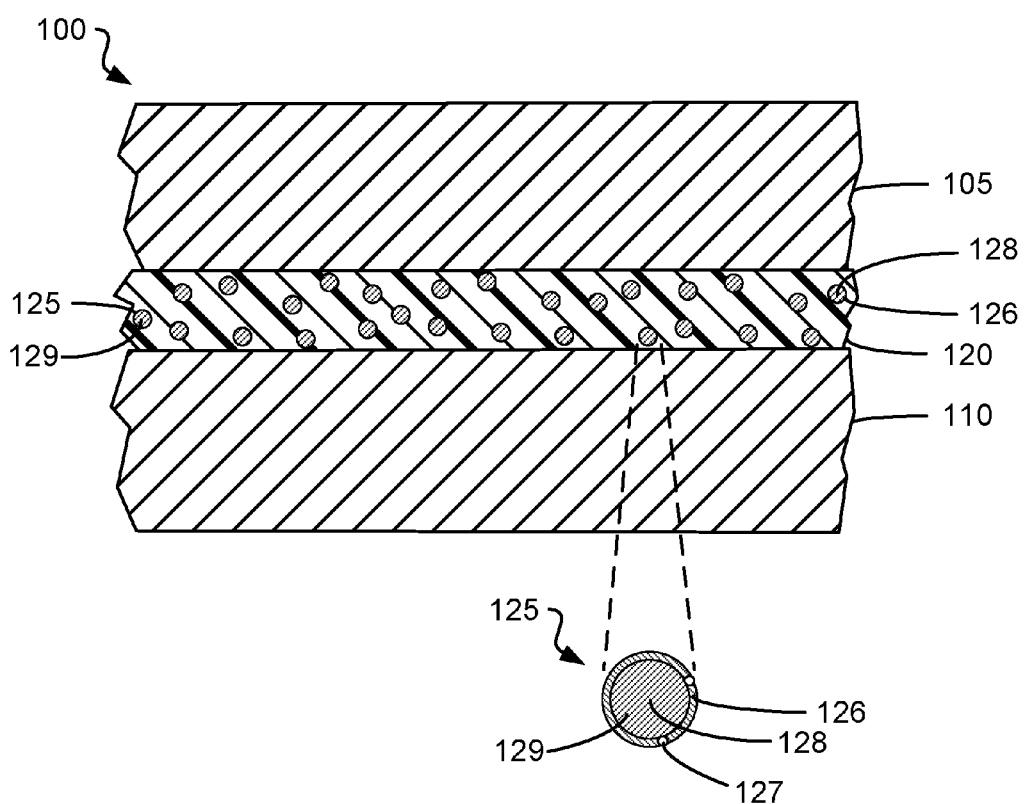
FIG. 1 is a cross-sectional view of an assembly having a coldplate (or heat sink) affixed to a cap (or lid) of an electronics module by an enhanced thermal interface material (TIM) gap filler having microcapsules adapted to rupture in a magnetic field in accordance with the preferred embodiments of the present invention.

According to the preferred embodiments of the present invention, an enhanced thermal interface material (TIM) gap filler for filling a gap between two substrates (e.g., between a coldplate and an electronics module) includes microcapsules adapted to rupture in a magnetic field. The microcapsules, which are distributed in a TIM gap filler, each have a shell that encapsulates a solvent. One or more organosilane-coated magnetic nanoparticles is/are covalently bound into the shell of each microcapsule. In one embodiment, (3-aminopropyl) trimethylsilane-coated magnetite nanoparticles are incorporated into the shell of a urea-formaldehyde (UF) microcapsule during in situ polymerization of the UF microcapsule. To enable easy removal of one substrate affixed to another substrate by the enhanced TIM gap filler, the substrates are positioned within a magnetic field sufficient to rupture the microcapsule shells through magnetic stimulation of the organosilane-coated magnetic nanoparticles. The ruptured microcapsule shells release the solvent, which dissolves and/or swells the TIM gap filler, thereby reducing the bond strength between the substrates.

Electronic components, such as a microprocessors and integrated circuits, must operate within certain specified temperature ranges to perform efficiently. Excessive temperature degrades electronic component functional performance, reliability, and life expectancy. Heat sinks are widely used for controlling excessive temperature. Typically, heat sinks are formed with fins, pins or other similar structures to increase the surface area of the heat sink and thereby enhance heat dissipation as air passes over the heat sink. In addition, it is not uncommon for heat sinks to contain high performance structures, such as vapor chambers and/or heat pipes, to enhance heat spreading into the extended area structure. Heat sinks are typically formed of highly conductive metals, such as copper or aluminum. More recently, graphite-based materials have been used for heat sinks because such materials offer several advantages, such as improved thermal conductivity and reduced weight.

Typically, in order to sufficiently cool higher power electronic components (e.g., in excess of 90 W power dissipation) to acceptable temperatures, the heat must be drawn directly off the top surface of the component using a cooling plate. Removing heat from the component topside, either by conduction through a thermally conductive cooling plate to the computer chassis structure or via fluid convection through an attached liquid-cooled cooling plate, results in a relatively low thermal resistance path to the external environment. The cooling plate, which may be either a thermally conductive plate or a liquid-cooled plate, is also referred to as a "coldplate".

Current solutions for topside cooling incorporate a coldplate (i.e., either a thermally conductive cooling plate or fluid-cooled cooling plate) that is hard mounted to the processor circuit board. Typically, one or more high power processors to be cooled is/are mounted on the topside of the processor circuit board, along with a plurality of other electronic components that are to be cooled. These current solutions typically utilize a fixed-gap coldplate, i.e., the coldplate is fixedly mounted to the processor circuit board so as to present a fixed-gap interface between the coldplate and each of the components to be cooled.

Electronic components are generally packaged using electronic packages (i.e., modules) that include a module substrate to which the electronic component is electronically connected. In some cases, the module includes a cap (i.e., a capped module) or a lid (i.e., a lidded module) which seals the electronic component within the module. In other cases, the module does not include a cap (i.e., a bare die module). In the case of a capped module (or a lidded module), the coldplate (or the heat sink) is typically attached with a thermal interface material (TIM) gap filler (also referred to as "TIM2") between a bottom surface of the coldplate (or heat sink) and a top surface of the cap (or lid), and another thermal interface material (TIM) gap filler (also referred to as "TIM1") between a bottom surface of the cap (or lid) and a top surface of the electronic component. In the case of a bare die module, a coldplate (or heat sink) is typically attached with a thermal interface material (TIM) gap filler between a bottom surface of the coldplate (or heat sink) and a top surface of the electronic component.

In general, it is desirable for the TIM gap filler (e.g., TIM1, TIM2, etc.) to exhibit adequate adhesion (i.e., the thermal performance of the interface is reduced if an air gap is introduced from voids or delamination), yet possess a low enough bond strength to allow for rework. In the case of a TIM2 gap filler, for instance, it is desirable for the TIM gap filler to exhibit adequate adhesion to both the bottom surface of the coldplate (or heat sink) and the top surface of a cap (or lid) of the electronics module, yet possess a low enough bond strength between itself and the coldplate (or heat sink) to allow for rework. In this case, the coldplate (or heat sink) must be completely removed from a defective electronics module to provide reworkability to the module during manufacture or in the field.

In accordance with the preferred embodiments of the present invention, an enhanced thermal interface material (TIM) gap filler can be instructed to release from the coldplate on demand. For example, by incorporating magnetic nanoparticles into the shell of a urethane-based microcapsule, encapsulating toluene in the core of the microcapsule, and distributing such microcapsules in a base silicone TIM2 in accordance with the preferred embodiments of the present invention, the toluene can be released from the microcapsules under application of an external magnetic field (i.e., "on demand"). Application of the magnetic field ruptures the microcapsule shell, which in turn releases the toluene. The toluene will solubilize or swell the base silicone TIM2, thereby reducing the adhesive strength between the TIM2 and the mating surfaces. This will enable rework of the assembly without exerting excessive force on sensitive components.

Figure 3:
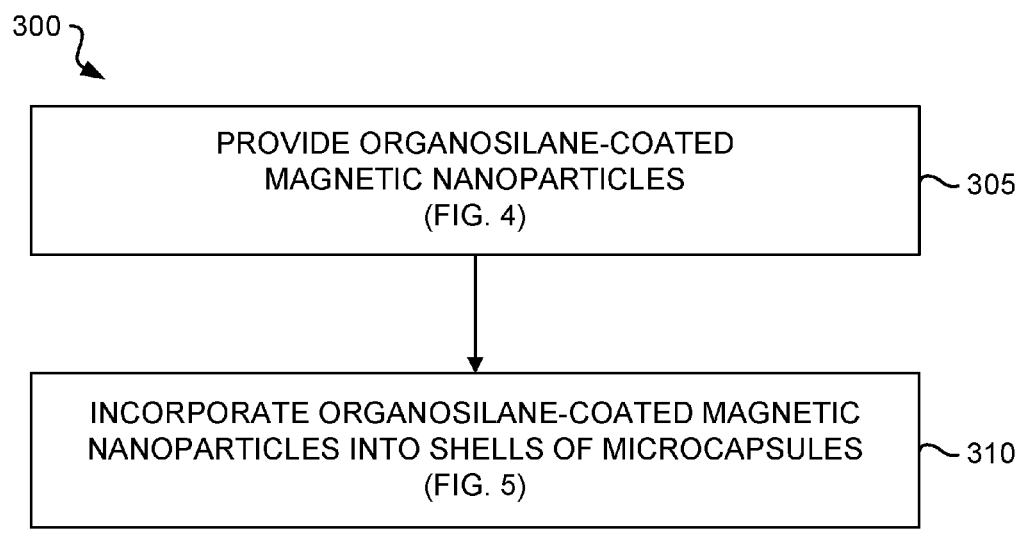
FIG. 3 is a flow diagram illustrating a method of preparing microcapsules adapted to rupture in a magnetic field in accordance with the preferred embodiments of present invention.

In accordance with the preferred embodiments of the present invention, microcapsules adapted to rupture in a magnetic field are prepared utilizing a multi-step process. This multi-step process is illustrated in FIG. 3. Initially, organosilane-coated magnetic nanoparticles are provided. This initial step corresponds to step 305 in FIG. 3, an example of which is illustrated in greater detail in FIG. 4. Then, the organosilane-coated magnetic nanoparticles are incorporated into shells of microcapsules. This subsequent step corresponds to step 310 in FIG. 3, an example of which is illustrated in greater detail in FIG. 5.

In accordance with the preferred embodiments of the present invention, an organo trialkoxysilane, such as aminopropyltriethoxysilane, is reacted with a mild acid (e.g., acetic acid, hydrochloric acid, formic acid) in an aqueous solution to form a hydrolyzed silane. This step, which corresponds to step 405 in FIG. 4, may be performed at ambient temperature or elevated temperatures to increase the reaction kinetics of the silane formation. Additionally, the solvent used in this step may be, for example, tetrahydrofuran, ethanol or methanol. Once the silane is formed, magnetic nanoparticles are added to the solution and mixed. This step corresponds to step 410 in FIG. 4. The magnetic nanoparticles may be, for example, $Fe_3O_4$ (also referred to as "magnetite") prepared using conventional techniques known to those skilled in the art.

An outline of an example of this subsequent step (corresponding to step 410 in FIG. 4) is set forth in Equation 1 below.

Equation 1

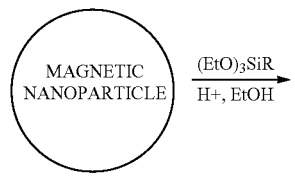

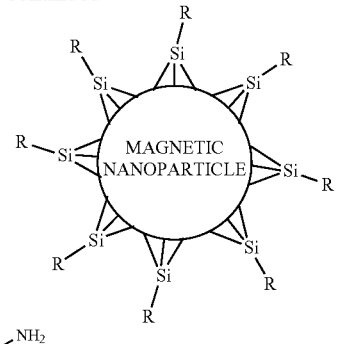

$R = $ ~~~~~~$NH_2$

This then results in the functionalization of a magnetic nanoparticle, which can be then covalently bound into the shell of a urea-formaldehyde (UF) microcapsule. This subsequent step corresponds to step 310 in FIG. 3, which step is illustrated in greater detail in FIG. 5. Toluene, for example, can be incorporated into the core of these microcapsules through conventional microcapsule fabrication processes (e.g., in situ polymerization of a urea-formaldehyde (UF) microcapsule shell around a core material to encapsulate that material) known to those skilled in the art.

Also, in accordance with the preferred embodiments of the present invention, an enhanced thermal interface material (TIM) gap filler may be prepared by adding microcapsules adapted to rupture in a magnetic field (e.g., prepared by the multi-step process illustrated in FIG. 3) to a conventional TIM gap filler. This corresponds to the method illustrated in FIG. 6.

Still further, in accordance with the preferred embodiments of the present invention, a first substrate (e.g., a coldplate) may be easily removed from a second substrate (e.g., a cap of an electronics module) by applying a magnetic field to an enhanced thermal interface material (TIM) gap filler (e.g., prepared by the process illustrated in FIG. 6) disposed between and adhering the substrates. Application of a sufficiently strong magnetic field (e.g., 2.5 kA/m or 31 Oe) causes the magnetic particles to rotate at an accelerated rate thereby rupturing the outer shell of the microcapsules and, in turn, releasing toluene. Toluene will either dissolve non-crosslinked silicone or swell crosslinked silicone resulting in a dramatic decrease in bond strength (due to plasticization and lowering of tensile modulus). The lower bond strength subsequently enables easy separation of the mated surfaces.

FIG. 1 is a cross-sectional view of an assembly 100 having a coldplate or heat sink 105 affixed to a cap or lid 110 of an electronics module by an enhanced thermal interface material (TIM) gap filler 120 having microcapsules 125 adapted to rupture in a magnetic field in accordance with the preferred embodiments of the present invention.

The TIM gap filler 120 (prior to modification by adding the microcapsules 125 in accordance with the preferred embodiments of the present invention, as described below with reference to FIG. 6) is conventional. The TIM gap filler 120 may be selected from any number of commercially available TIM products. For example, commercially available TIM2 products that are suitable for use as the TIM gap filler 120 include, but are not limited to, "Chomerics T636" available from Chomerics, a Division of Parker Hannifin Corporation, Woburn, Mass. and "Bergquist GF3500" available from The Bergquist Company, Chanhassen, Minn.

Each microcapsule 125 has a shell 126 into which one or more organosilane-coated magnetic nanoparticles 127 is/are covalently bound. The shell 126 of each microcapsule 125 defines a core 128 within which a solvent 129 is encapsulated. In FIG. 1, the core 128 of each microcapsule 125 is illustrated with cross-hatched lines to denote the core 128 is filled with solvent 129. In accordance with the preferred embodiments of the present invention, each microcapsule 125 is a urea-formaldehyde (UF) microcapsule having a UF-based shell 126 into which one or more (3-aminopropyl) trimethylsilane-coated magnetic nanoparticles 127 is/are covalently bound. The UF microcapsule 125 encapsulates one or more suitable solvents 129, such as toluene.

The solvent 129 that is encapsulated may be selected from any number of materials that dissolve and/or swell the TIM gap filler 120. Suitable solvents include, but are not limited to, toluene, ethyl acetate, xylene, acetone, or suitable combinations thereof.

While the microcapsules 125 in the example above are described in the context of urea-formaldehyde (UF) microcapsules having UF-based shells 126, this particular microcapsule material is merely exemplary. Suitable materials for the shells of the microspheres include, but are not limited to, urea-formaldehyde, vinylidene chloride-acrylonitrile copolymer, polyvinyl alcohol, polyvinyl butyral, polymethylmethacrylate, polyacrylonitrile, polyvinylidene chloride, polysulfone, and the like. The solvent 129 is encapsulated within the shells 126 to form microcapsules 125 using techniques known to those skilled in the art, such as an in-situ polymerization method, a coacervation method, or an interfacial polymerization method—these conventional techniques, however, are modified in accordance with the preferred embodiment of the present invention so that one or more organosilane-coated magnetic nanoparticles 127 is/are covalently bound into the shell 126 of each microcapsule 125. For example, as described below with reference to FIG. 5, the microcapsules 125 may be produced by in situ polymerization of urea-formaldehyde shells 126 around the solvent 129.

Figure 2:
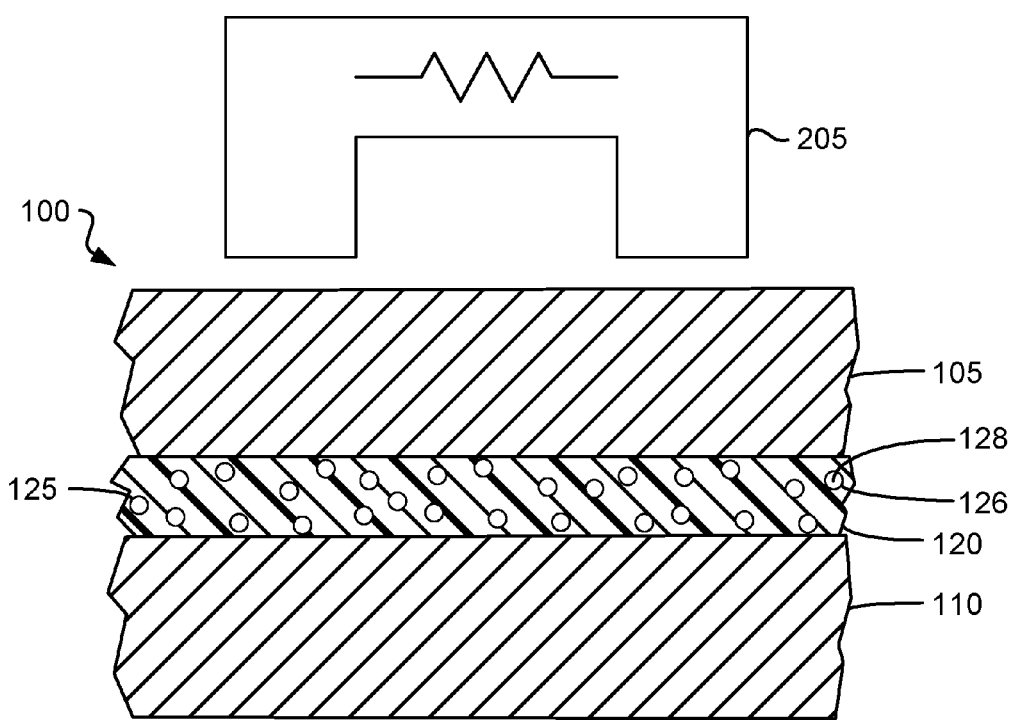
FIG. 2 is a cross-sectional view of the assembly shown in FIG. 1 positioned for rework proximate a magnetic field generating device in accordance with the preferred embodiments of the present invention.

FIG. 2 is a cross-sectional view of the assembly 100 shown in FIG. 1 that is positioned for rework proximate a magnetic field generating device 205 in accordance with the preferred embodiments of the present invention. The magnetic field generated by the magnetic field generating device 205 is sufficient to rupture the microcapsule shells 126 through magnetic stimulation of the organosilane-coated magnetic nanoparticles 127. Application of a sufficiently strong high-frequency magnetic field causes the organosilane-coated magnetic nanoparticles 127 embedded in the microcapsule shells 126 to rotate and/or vibrate at an accelerated rate thereby rupturing the microcapsule shells 126 of the microcapsules 125 and, in turn, releasing the encapsulated solvent 129. Preferably, the high-frequency magnetic field applied to the assembly 100 by the magnetic field generating device 205 has a frequency of approximately 50-100 kHz and a strength of approximately 2.5 kA/m or 31 Oe. The solvent 129 is released from the core 128 of each ruptured microcapsule shell 126 and dissolves and/or swells the TIM gap filler 120, thereby reducing the bond strength between the cold plate (or heat sink) 105 and the cap (or lid) 110. In FIG. 2, the core 128 of each microcapsule 125 is illustrated without cross-hatched lines to denote the core 128 is no longer filled with solvent 129 (shown in FIG. 1).

The magnetic field generating device 205 is conventional, and typically includes a power supply, a functional generator, an amplifier, a multi-loop coil, and a cooling system. Preferably, the temperature of the magnetic field generating device 205 is controlled by cycling cooling water at 25° C. through the cooling system.

FIG. 3 is a flow diagram illustrating a method 300 of preparing microcapsules adapted to rupture in a magnetic field in accordance with the preferred embodiments of the present invention. In the method 300, the steps discussed below (steps 305-310) are performed. These steps are set forth in their preferred order. It must be understood, however, that the various steps may occur simultaneously.

In accordance with the preferred embodiments of the present invention, the method 300 begins by providing organosilane-coated magnetic nanoparticles (step 305). An example of this step 305 of providing organosilane-coated magnetic nanoparticles is illustrated in greater detail in FIG. 4. The method 300 continues by incorporating the organosilane-coated magnetic nanoparticles into shells of microcapsules (step 310). An example of this step 310 of incorporating the organosilane-coated magnetic nanoparticles into shells of microcapsules is illustrated in greater detail in FIG. 5

Figure 4:
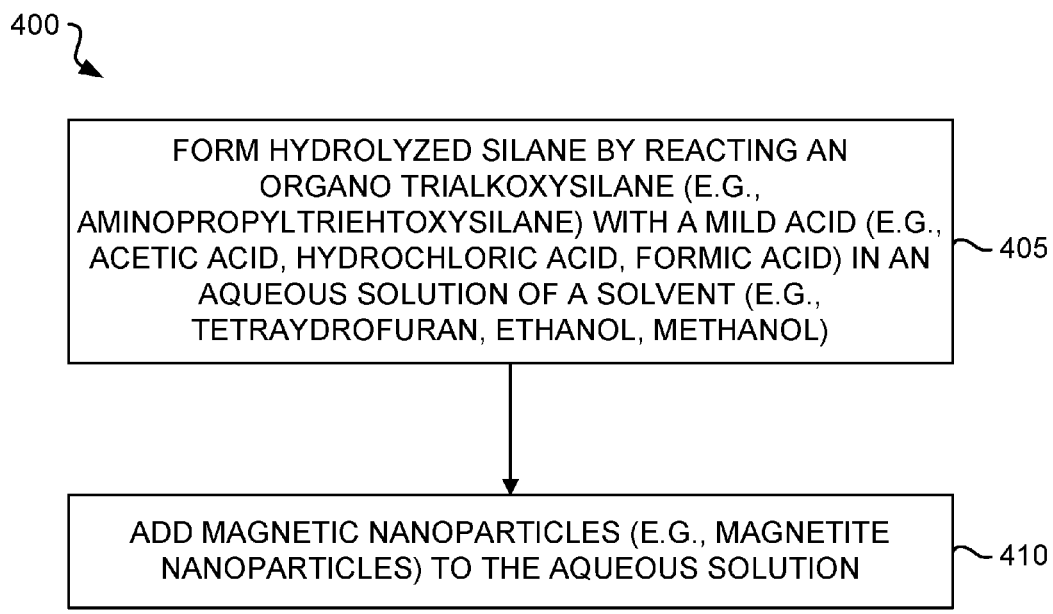
FIG. 4 is a flow diagram illustrating a method of preparing organosilane-coated magnetic nanoparticles in accordance with the preferred embodiments of present invention.

FIG. 4 is a flow diagram illustrating a method 400 of preparing organosilane-coated magnetic nanoparticles in accordance with the preferred embodiments of present invention. In the method 400, the steps discussed below (steps 405-410) are performed. These steps are set forth in their preferred order. It must be understood, however, that the various steps may occur simultaneously.

In accordance with the preferred embodiments of the present invention, the method 400 begins by reacting an organo trialkoxysilane, such as aminopropyltriethoxysilane, with a mild acid (e.g., acetic acid, hydrochloric acid, formic acid) in an aqueous solution to form a hydrolyzed silane (step 405). This step 405 is performed using standard silane hydrolysis procedures known to those skilled in the art. The hydrolyzed silane formation step 405 may be performed at ambient temperature or elevated temperatures to increase the reaction kinetics of the silane formation. Additionally, the aqueous solution used in the hydrolyzed silane formation step 405 includes a suitable solvent, such as tetrahydrofuran, ethanol or methanol.

One skilled in the art will appreciate that the organo trialkoxysilane reacted in the hydrolyzed silane formation step 405 may be selected from a group of suitable organo trialkoxysilanes including, but not limited to, amine-terminated trialkoxysilanes, vinyl-terminated trialkoxysilanes, and isocyanate-terminated trialkoxysilanes. Examples of additional suitable organo trialkoxysilanes include:

Trimethoxy[3-(methylamino)propyl]silane
[3-(2-Aminoethylamino)propyl]trimethoxysilane
3-(Triethoxysilyl)propyl isocyanate-(3-Trimethoxysilylpropyl)diethylenetriamine Once the hydrolyzed silane is formed in the step 405, the method 400 continues by adding magnetic nanoparticles to the solution (step 410). Preferably, the hydrolyzed silane solution is mixed while the magnetic nanoparticles are added and/or thereafter.

The magnetic nanoparticles may be, for example, $Fe_3O_4$ (also referred to as "magnetite") nanoparticles, cobalt ferrite nanoparticles, or other magnetic nanoparticles known in the art. Preferably, the magnetic nanoparticles have a diameter in the range of approximately 6-25 nm The magnetic nanoparticles are prepared using conventional techniques known to those skilled in the art. For example, magnetite nanoparticles may be prepared using a conventional technique known as the "coprecipitation method." See, for example, the discussion of preparing magnetite nanoparticles using the coprecipitation method in the article to M. Yamaura et al., "Preparation and characterization of (3-aminopropyl) triethoxysilane-coated magnetite nanoparticles," Journal of Magnetism and Magnetic Materials, Vol. 279, pages 210-217, 2004, which is hereby incorporated herein by reference in its entirety.

An example of a conventional technique of preparing magnetite nanoparticles follows. This conventional example is based on an example set forth in the M. Yamaura et al. article. A 5 mol/l NaOH solution is added into a mixed solution of 0.25 mol/l ferrous chloride and 0.5 mol/l ferric chloride (molar ratio 1:2) until obtaining pH 11 at room temperature. The slurry is washed repeatedly with distilled water. Then, the resulting magnetite nanoparticles are magnetically separated from the supernatant and redispersed in aqueous solution at least three times, until obtaining pH 7. The M. Yamaura et al. article reports that a typical average diameter of the resulting magnetite nanoparticles is 12 nm.

Alternatively, the magnetite nanoparticles may be prepared and then coated with (3-aminopropyl)triethoxysilane using the silanization reaction set forth in the M. Yamaura et al. article. That is, the magnetite suspension (i.e., the resulting magnetite nanoparticles redispersed in aqueous solution at least three times, until obtaining pH 7, as discussed above) may be heated with glycerol and 40 ml of a 10% water solution of (3-aminopropyl)triethoxysilane (pH 4.0, adjusted with glacial acetic acid) in a water bath for three hours. The silanization reaction set forth in the M. Yamaura et al. article occurs in two steps. In the first step, the organosilane is placed into an aqueous solution of an acid that acts as a catalyst. The organosilane is hydrolyzed, and a condensation reaction occurs to form a silane polymer. In the hydrolysis reaction, alkoxide groups ($-OC_2H_5$) are replaced by hydroxyl groups (—OH) to form reactive silanol groups to produce siloxane bonds (Si—O—Si). Alcohol ($C_2H_5OH$) and water are produced as by-products of condensation. In the second step, the polymer associates with the magnetite crystallites (or surface clusters) forming a covalent bond with OH groups. Dehydration as well as adsorption of silane polymers to the metal oxide occurs. In sequence, after magnetic separation, the silanized magnetite particles may be thoroughly washed with distilled water and dried, yielding a fine powder. The M. Yamaura et al. article reports that a typical average diameter of the resulting (3-aminopropyl) triethoxysilane-coated magnetite nanoparticles is 15 nm.

Figure 5:
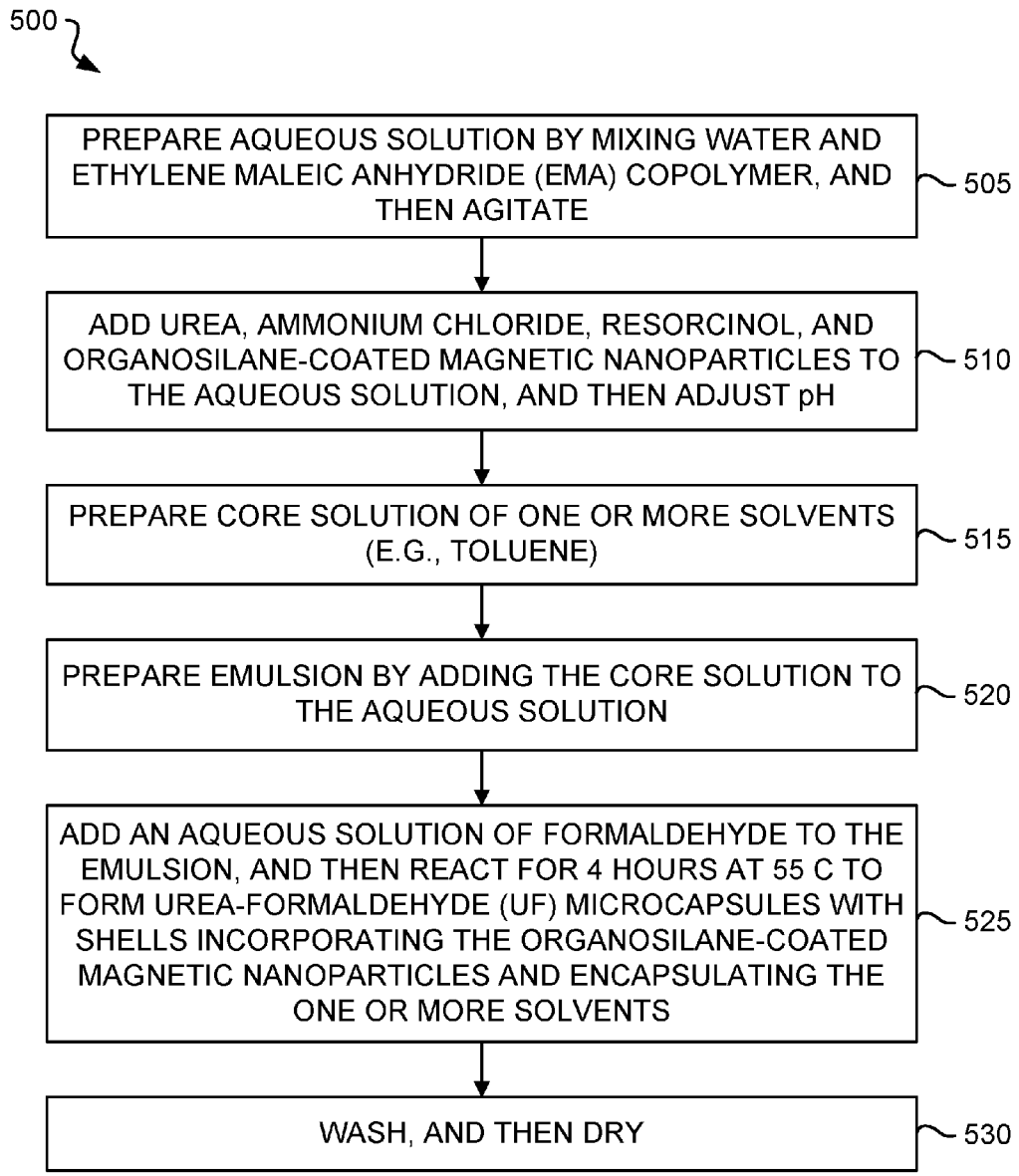
FIG. 5 is a flow diagram illustrating a method of incorporating organosilane-coated magnetic nanoparticles into shells of microcapsules in accordance with the preferred embodiments of present invention.

FIG. 5 is a flow diagram illustrating a method 500 of incorporating organosilane-coated magnetic nanoparticles into shells of microcapsules in accordance with the preferred embodiments of present invention. In the method 500, the steps discussed below (steps 505-530) are performed. These steps are set forth in their preferred order. It must be understood, however, that the various steps may occur simultaneously or at other times relative to one another. Moreover, those skilled in the art will appreciate that one or more steps may be omitted.

In accordance with the preferred embodiments of the present invention, conventional microcapsule fabrication processes (e.g., in situ polymerization of urea-formaldehyde (UF) microcapsule shells) may be modified to incorporate the organosilane-coated magnetic nanoparticles so that the nanoparticles are covalently bound into shells of microcapsules. Such conventional fabrication processes are described in E. N. Brown et al., "In situ poly(urea-formaldehyde) microencapsulation of dicyclopentadiene," Journal of Microencapsulation, Vol. 20, No. 6, pages 719-730, 2003 and B. J. Blaiszik et al., "Microcapsules filled with reactive solutions for self-healing materials," Polymer, Vol. 50, pages 990-997, 2009, each of which is hereby incorporated herein by reference in its entirety.

The method 500 begins by preparing an aqueous solution by mixing water and ethylene maleic anhydride (EMA) copolymer, and then agitating the aqueous solution (step 505). For example, 200 ml of deionized water and 50 ml of 2.5 wt % aqueous solution of EMA copolymer may be mixed at room temperature (20-24° C.) in a 1000 ml beaker. The beaker may be suspended in a temperature-controlled water bath on a programmable hotplate monitored with an external temperature probe. The aqueous solution may be agitated with a digital mixer driving a three-bladed, 63.5 mm diameter low-shear mixing propeller placed just above the bottom of the beaker. Preferably, the aqueous solution is agitated at 200-2000 rpm.

Next, the method 500 continues by adding urea, ammonium chloride, resorcinol, and organosilane-coated magnetic nanoparticles to the aqueous solution, and then adjusting the pH (step 510). Preferably, an appropriate amount of organosilane-coated magnetic nanoparticles are added to the aqueous solution such that urea-formaldehyde (UF) microcapsules are fabricated that have a magnetic nanoparticle content of approximately 0.5-20 wt %. For example, while the aqueous solution is under agitation (e.g., at 800 rpm), 5.0 g urea, 0.5 g ammonium chloride, 0.5 g resorcinol, and 1.2 g organosilane-coated magnetic nanoparticles may be added in the aqueous solution. The pH may then be raised from approximately 2.6 to 3.5 by drop-wise addition of sodium hydroxide (NaOH). One or more drops of 1-octanol may be added to eliminate surface bubbles.

In lieu of, or in addition to, adding organosilane-coated magnetic nanoparticles to the aqueous solution during step 510, the nanoparticles may be added to the emulsion during step 525. In either case, an appropriate amount of organosilane-coated magnetic nanoparticles are added such that urea-formaldehyde (UF) microcapsules are fabricated that have a magnetic nanoparticle content of approximately 0.5-20 wt %.

The method 500 continues by preparing a core solution of one or more solvents (step 515). For example, 60 ml of a core solution comprised entirely of toluene may be prepared. This core solution preparation step 515 may be performed at any time prior to the emulsion preparation step 520, described below.

Next, the method 500 continues by preparing an emulsion by adding the core solution to the aqueous solution (step 520). For example, a slow stream of 60 ml of toluene core solution (prepared in step 515) may be added to the aqueous solution (prepared in step 510) to form an emulsion. The emulsion is allowed to stabilize, preferably for about 10 min.

Then, the method 500 continues by adding an aqueous solution of formaldehyde to the emulsion, and then reacted for 4 hours at 55° C. to form urea-formaldehyde (UF) microcapsules with shells incorporating the organosilane-coated magnetic nanoparticles and encapsulating the one or more solvents (step 525). For example, after stabilization of the emulsion (in step 520), 12.7 g of 37 wt % aqueous solution of formaldehyde (this solution is also known as "formalin") may be added to the emulsion (prepared in step 520) to obtain a 1:1.9 molar ratio of formaldehyde to urea. The resulting emulsion may be covered and heated at a rate of 1° C./min to the target temperature of 55° C. After 4 hours of continuous agitation (e.g., at 800 rpm), the mixer and hot plate may be switched off. Once cooled to ambient temperature, the suspension of microcapsules may be separated under vacuum with a coarse-fritted filter.

Finally, the method 500 concludes by washing and then drying the microcapsules (step 530). For example, the microcapsules (prepared in step 525) may be rinsed with deionized water and air dried for 24-48 hours. A sieve may be used to aid in the separation of the microcapsules.

Figure 6:
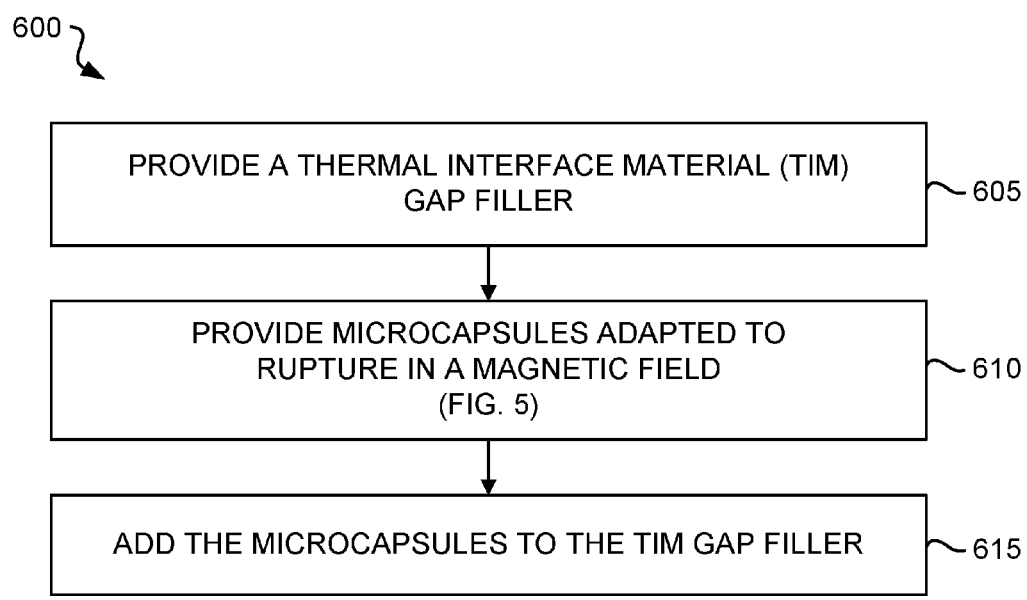
FIG. 6 is a flow diagram illustrating a method of preparing an enhanced thermal interface material (TIM) gap filler in accordance with the preferred embodiments of present invention.

FIG. 6 is a flow diagram illustrating a method of preparing an enhanced thermal interface material (TIM) gap filler in accordance with the preferred embodiments of present invention. In the method 600, the steps discussed below (steps 605-615) are performed. These steps are set forth in their preferred order. It must be understood, however, that the various steps may occur simultaneously or at other times relative to one another. Moreover, those skilled in the art will appreciate that one or more steps may be omitted.

The method 600 begins by providing a TIM gap filler (step 605). The TIM gap filler may be selected from any number of commercially available TIM products. For example, commercially available TIM2 products that are suitable for use as the TIM gap filler include, but are not limited to, "Chomerics T636" available from Chomerics, a Division of Parker Hannifin Corporation, Woburn, Mass. and "Bergquist GF3500" available from The Bergquist Company, Chanhassen, Minn.

The method 600 continues by providing microcapsules adapted to rupture in a magnetic field (step 610). For example, such microcapsules may be prepared in accordance to the method 500, described above with reference to FIG. 5. The microcapsule preparation step may be performed any time prior to the loading step 615, described below.

The method 600 concludes by adding the microcapsules to the TIM gap filler (step 615). The relative amount of microcapsules added to the TIM gap filler (i.e., the load ratio) is dependent upon a number of factors, including the reduction in adhesive force required. Generally, a suitable load ratio is determined empirically. Typically, a suitable load ratio falls within the range of approximately 1-20 wt %.

Figure 7:
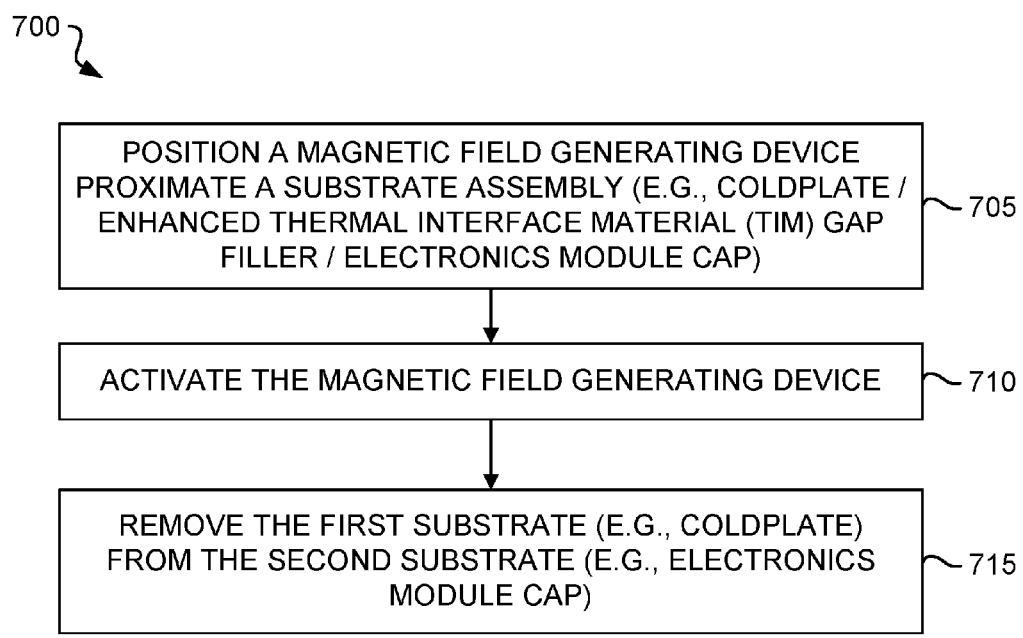
FIG. 7 is a flow diagram illustrating a method of removing a first substrate from a second substrate affixed to the first substrate by an enhanced thermal interface material (TIM) gap filler in accordance with the preferred embodiments of present invention.

FIG. 7 is a flow diagram illustrating a method of removing a first substrate from a second substrate affixed to the first substrate by an enhanced thermal interface material (TIM) gap filler in accordance with the preferred embodiments of present invention. In the method 700, the steps discussed below (steps 705-715) are performed. These steps are set forth in their preferred order. It must be understood, however, that the various steps may occur simultaneously or at other times relative to one another. Moreover, those skilled in the art will appreciate that one or more steps may be omitted.

The method 700 begins by positioning a magnetic field generating device proximate a substrate assembly (step 705). For example, the magnetic field generating device 205 (shown in FIG. 2) may be positioned proximate the substrate assembly 100 (shown in FIGS. 1 and 2).

Then, the method 700 continues by activating the magnetic field generating device (step 710). For example, activation of the magnetic field generating device may be accomplished by initiating the flow electrical current through the device's multi-loop coil to generate a magnetic field having the desired strength.

The method 700 concludes by removing the first substrate from the second substrate (step 715). For example, as a consequence of activation of the magnetic field generating device, the microcapsule shells rupture, the ruptured microcapsules release the solvent encapsulated in the microcapsules, the released solvent dissolves and/or swells the TIM gap filler, thereby reducing the bond strength between the substrates of the substrate assembly. Consequently, the substrates may be readily removed one from the other. In the case of the substrate assembly 100 (shown in FIGS. 1 and 2), for instance, as a consequence of activation of the magnetic field generating device 205 (shown in FIG. 2), the coldplate 105 may be readily removed from the electronics module 110.

One skilled in the art will appreciate that many variations are possible within the scope of the present invention. For example, although the preferred embodiments of the present invention are described herein in the context of removing a coldplate adhered to an electronics module by a TIM gap filler, the present invention may be utilized in the context of other substrate assemblies, such as a label adhered to a product by an adhesive layer. In such an alternative embodiment, microcapsules encapsulating an adhesive solvent and adapted to rupture in a magnetic field may be distributed in the adhesive layer. Thus, while the present invention has been particularly shown and described with reference to the preferred embodiments thereof, it will be understood by those skilled in the art that these and other changes in form and detail may be made therein without departing from the spirit and scope of the present invention.

What is claimed is:

1. A microcapsule adapted to rupture in a magnetic field, comprising:
a urea-formaldehyde (UF) microcapsule having a shell into which one or more organosilane-coated magnetic nanoparticles is/are covalently bound so that the one or more organosilane-coated magnetic nanoparticles is/are embedded in the shell of the UF microcapsule, wherein the shell of the UF microcapsule encapsulates a solvent.

2. The microcapsule adapted to rupture in a magnetic field as recited in claim 1, wherein the one or more organosilane-coated magnetic nanoparticles is/are one or more (3-aminopropyl) trimethylsilane-coated magnetite nanoparticles.

3. The microcapsule adapted to rupture in a magnetic field as recited in claim 2, wherein the [shell of the UF microcapsule encapsulates] solvent is toluene.

4. An enhanced thermal interface material (TIM) gap filler, comprising:
a TIM gap filler; and
microcapsules adapted to rupture in a magnetic field distributed in the TIM gap filler, wherein each microcapsule has a shell encapsulating a solvent and into which one or more organosilane-coated magnetic nanoparticles is/are covalently bound so that the one or more organosilane-coated magnetic nanoparticles is/are embedded in the shell of the microcapsule, and wherein the solvent is selected to dissolve and/or swell the TIM gap filler when the solvent is released from encapsulation upon rupture of the microcapsules in the magnetic field.

5. The enhanced thermal interface (TIM) gap filler as recited in claim 4, wherein the microcapsules include urea-formaldehyde (UF) microcapsules each having a shell into which one or more (3-aminopropyl) trimethylsilane-coated magnetite nanoparticles is/are covalently bound.

6. The enhanced thermal interface (TIM) gap filler as recited in claim 5, wherein the solvent is toluene.

7. A microcapsule adapted to rupture in a magnetic field, comprising:
a microcapsule having a shell encapsulating a solvent and into which one or more organosilane-coated magnetic nanoparticles is/are covalently bound so that the one or more organosilane-coated magnetic nanoparticles is/are embedded in the shell of the microcapsule, wherein the microcapsule is to be added into a thermal interface material (TIM) gap filler, and wherein the solvent is selected to dissolve and/or swell the TIM gap filler when the solvent is released from encapsulation upon rupture of the microcapsule in a magnetic field.

8. The microcapsule adapted to rupture in a magnetic field as recited in claim 7, wherein the microcapsule is a urea-formaldehyde (UF) microcapsule having a shell into which one or more (3-aminopropyl) trimethylsilane-coated magnetite nanoparticles is/are covalently bound.

9. The microcapsule adapted to rupture in a magnetic field as recited in claim 8, wherein the shell of the UF microcapsule encapsulates toluene.

* * * * *